(12) United States Patent
Wallstein et al.

(10) Patent No.: US 7,384,216 B2
(45) Date of Patent: Jun. 10, 2008

(54) CABLE COUPLER HAVING RETAINED WEDGES

(75) Inventors: Alexander I. Wallstein, Laguna Beach, CA (US); Raymond Brandon, Grand Junction, CO (US)

(73) Assignee: Dywidag-Systems International USA, Bolingbrook, IL (US)

( * ) Notice: Subject to any disclaimer, the term of this patent is extended or adjusted under 35 U.S.C. 154(b) by 115 days.

(21) Appl. No.: 11/224,492

(22) Filed: Sep. 12, 2005
(Under 37 CFR 1.47)

(65) Prior Publication Data

US 2006/0211311 A1 Sep. 21, 2006

Related U.S. Application Data

(60) Provisional application No. 60/610,370, filed on Sep. 16, 2004.

(51) Int. Cl.
*E21D 21/00* (2006.01)
(52) U.S. Cl. ............. 405/302.2; 439/863; 403/319
(58) Field of Classification Search ............ 405/302.2; 439/816, 863
See application file for complete search history.

(56) References Cited

U.S. PATENT DOCUMENTS

| | | | |
|---|---|---|---|
| 1,988,171 A | * | 1/1935 | Frank et al. ............... 439/832 |
| 2,850,937 A | | 9/1958 | Ralston |
| 3,427,811 A | | 2/1969 | White |
| 3,505,824 A | | 4/1970 | White |
| 3,509,726 A | | 5/1970 | White |
| 3,601,994 A | | 8/1971 | Gatis |
| 3,650,112 A | | 3/1972 | Howlett et al. |
| 4,081,954 A | * | 4/1978 | Arnold ..................... 59/86 |
| 4,140,428 A | | 2/1979 | McLain et al. |
| 4,265,571 A | | 5/1981 | Scott |
| 4,349,300 A | | 9/1982 | Kelley |
| 4,367,664 A | | 1/1983 | Ekshtut |
| 4,384,812 A | | 5/1983 | Miyagawa |
| 4,395,161 A | | 7/1983 | Wilson et al. |
| 4,449,855 A | | 5/1984 | Langwadt |
| 4,473,209 A | | 9/1984 | Gallis et al. |
| 4,498,816 A | | 2/1985 | Korpela et al. |
| 4,596,496 A | | 6/1986 | Tyrell et al. |
| 4,601,616 A | | 7/1986 | Barish et al. |
| 4,630,974 A | | 12/1986 | Sherman |

(Continued)

FOREIGN PATENT DOCUMENTS

AT 198482 7/1958

(Continued)

*Primary Examiner*—Tara L. Mayo
(74) *Attorney, Agent, or Firm*—Marshall, Gerstein & Borun LLP

(57) ABSTRACT

A cable coupler includes a body having a first end, a second end, and first and second passageways sized and shaped to receive a cable, with each passageway including a tapered portion. A wedge assembly is disposed in each tapered portion to secure a cable to the body. A clip assembly is attached to the body adjacent the tapered portion of each of the passageways and is shiftable between a closed position in which the clip assembly is positioned to prevent an adjacent one of the wedge assemblies from exiting the corresponding passageway and an open position in which the adjacent wedge assembly is insertable into the tapered portion of the corresponding passageway.

22 Claims, 7 Drawing Sheets

U.S. PATENT DOCUMENTS

| | | | |
|---|---|---|---|
| 4,634,318 A | 1/1987 | Koumal | |
| 4,648,753 A | 3/1987 | Stephan | |
| 4,666,344 A | 5/1987 | Seegmiller | |
| 4,699,547 A | 10/1987 | Seegmiller | |
| 4,724,639 A | 2/1988 | Moser | |
| 4,749,310 A | 6/1988 | White | |
| 4,759,177 A * | 7/1988 | Brazell | 59/86 |
| 4,798,501 A | 1/1989 | Spies | |
| 4,832,534 A | 5/1989 | Duvieusart | |
| 4,884,377 A | 12/1989 | Matt | |
| 4,934,873 A | 6/1990 | Calandra, Jr. | |
| 4,946,315 A | 8/1990 | Chugh et al. | |
| 4,960,348 A | 10/1990 | Seegmiller | |
| 5,026,217 A | 6/1991 | Seegmiller | |
| 5,176,473 A | 1/1993 | Seegmiller | |
| 5,193,940 A | 3/1993 | Long | |
| 5,219,253 A | 6/1993 | Shinjo | |
| 5,222,837 A | 6/1993 | Phillips | |
| 5,230,589 A | 7/1993 | Gillespie | |
| 5,238,329 A | 8/1993 | Long et al. | |
| 5,259,703 A | 11/1993 | Gillespie | |
| 5,302,056 A | 4/1994 | Calandra, Jr. et al. | |
| 5,378,087 A | 1/1995 | Locotos | |
| 5,415,498 A | 5/1995 | Seegmiller | |
| 5,425,602 A | 6/1995 | Seegmiller | |
| 5,462,391 A | 10/1995 | Castle et al. | |
| 5,466,095 A | 11/1995 | Scott | |
| 5,544,982 A | 8/1996 | Seegmiller | |
| 5,584,608 A | 12/1996 | Gillespie | |
| 5,624,212 A | 4/1997 | Gillespie | |
| 5,755,535 A * | 5/1998 | Fox | 405/288 |
| 5,797,659 A | 8/1998 | Fuller | |
| 5,829,922 A | 11/1998 | Calandra, Jr. et al. | |
| 5,913,641 A * | 6/1999 | Long | 405/302.2 |
| 5,919,006 A | 7/1999 | Calandra, Jr. et al. | |
| 5,967,703 A | 10/1999 | Stankus et al. | |
| 6,056,482 A | 5/2000 | Calandra, Jr. et al. | |
| 6,088,985 A | 7/2000 | Clark | |
| 6,113,060 A | 9/2000 | Wilde | |
| 6,293,067 B1 | 9/2001 | Meendering | |
| 6,322,290 B1 * | 11/2001 | Calandra et al. | 405/259.1 |
| 6,533,603 B1 * | 3/2003 | Togami | 439/372 |
| 6,619,888 B2 | 9/2003 | Calandra, Jr. et al. | |
| 6,712,574 B1 | 3/2004 | Roopnarine | |
| 6,722,099 B2 | 4/2004 | Gilbert et al. | |
| 6,884,005 B1 * | 4/2005 | Seegmiller | 405/288 |
| 7,066,688 B2 * | 6/2006 | Wallstein et al. | 405/302.2 |
| 7,066,746 B1 * | 6/2006 | Togami et al. | 439/157 |
| 7,118,310 B2 | 10/2006 | Wallstein et al. | |
| 7,261,494 B2 | 8/2007 | Stankus et al. | |
| 2003/0068214 A1 | 4/2003 | Sommer et al. | |
| 2005/0201837 A1 | 9/2005 | Stankus et al. | |
| 2006/0211311 A1 | 9/2006 | Wallstein et al. | |

FOREIGN PATENT DOCUMENTS

| | | |
|---|---|---|
| CA | 2313933 | 1/2001 |

* cited by examiner

CABLE COUPLER HAVING RETAINED WEDGES

FIELD OF THE INVENTION

The invention relates generally to cable couplers for joining a pair of cables under tension and, more specifically, to a cable coupler having retained wedges.

BACKGROUND OF THE INVENTION

Cable couplers that couple two tensioned cables together are used in many applications. For example, in underground mining operations a cable roof truss is created in an underground mine passage generally consists of a tensioned cable extending between a pair of embedded roof anchors. Many times, the tensioned cable is made up of two sections which must be joined by a coupler. The construction industry also uses joined cables in a number of applications, such as in column wrapping, ring-tensioning applications, or with barrier cable installations often seen in parking garages.

A first design for a cable coupler is known as a spacer tube, often rectangular in section that has two barrels extending through the coupler. The cables are pulled through the barrels in opposite directions and tensioned. A set of wedge pieces are placed in the barrels adjacent the cables and the cables are released. The cables pull backward under their own tension, drawing the wedge pieces into the barrel. The wedge pieces grip the cables and lock the cables relative to the coupler.

A second design incorporates a curved path for each of the cables. This design, commonly known as the "dog bone" coupler due to the distinctive shape of the coupler, is different than the spacer tube in that the passages for the cables are curved to reduce sharp edges and to more evenly distribute the forces along the cable. Again, after the cables are tensioned and released, the cables and the retaining wedges are drawn into the tapered passageways of the coupler, drawing the wedge pieces into progressively greater contact with the cables so that the wedge pieces grip and lock the cables relative to the coupler.

In both of the aforementioned designs, the user must first insert both cables through the barrels of the coupler and then, using a tensioner, place the cables under tension. The wedge pieces must be manually placed adjacent the cables and in the tapered portion of the barrels. Unfortunately, these loose wedge pieces can easily fall to the ground during installation, and the wedge pieces may be lost in the darkness of a mine passage. Valuable time may be lost looking for and recovering any dropped or lost wedge pieces. To alleviate this often-encountered problem, suppliers generally provide extra wedges with the cable coupler. However, even if the wedge pieces are not lost, time and manual dexterity are required to insert the wedges into the coupler, which may have to be accomplished in a cold and/or dark setting.

Figure 1:
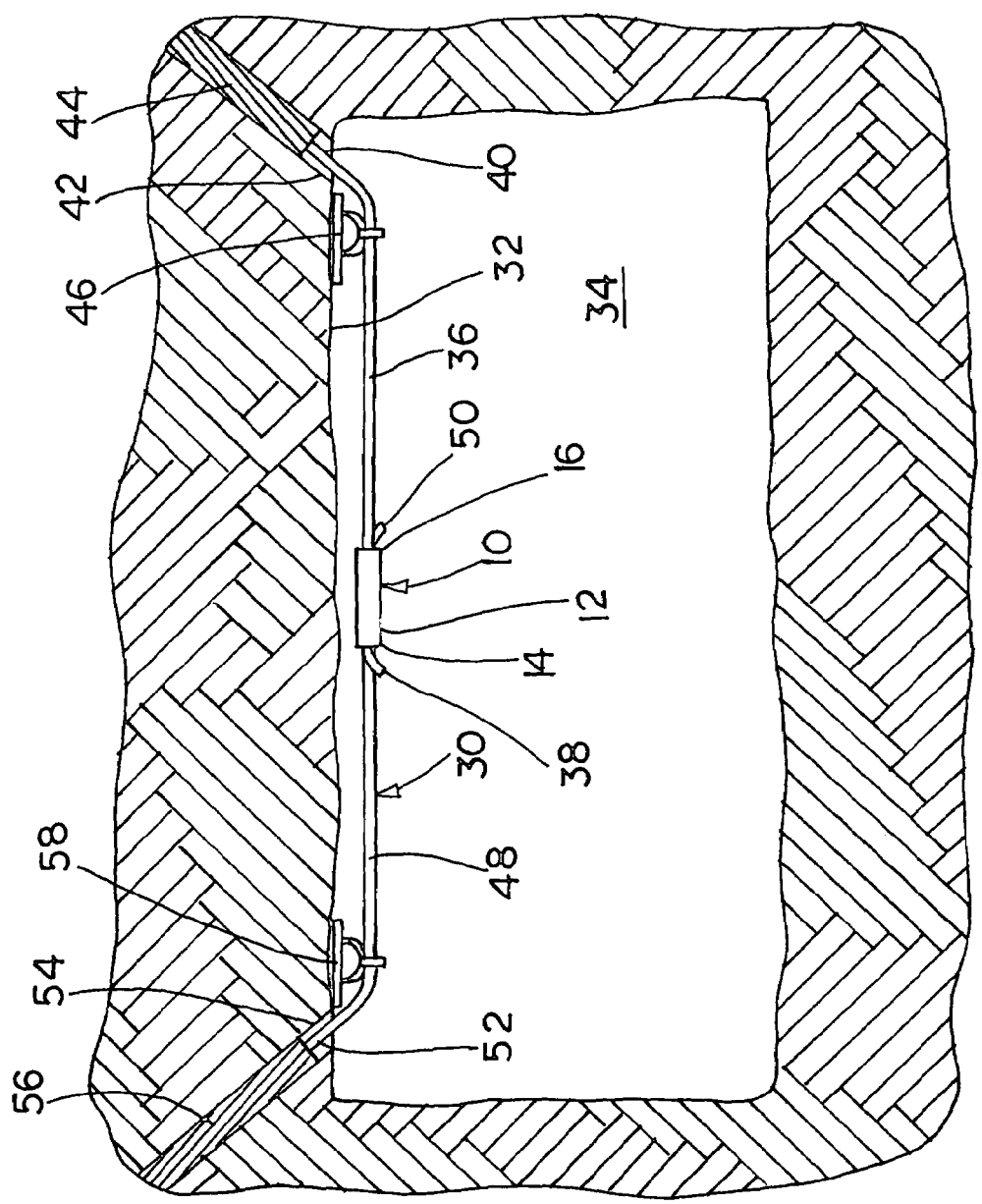
FIG. 1 is an elevational view, partly in section, of a cable truss system incorporating a cable coupler assembled in accordance with the teachings of the present invention and shown disposed in a mine passage.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and the equivalents falling within the spirit and scope of the invention as defined by the appended claims.

DETAILED DESCRIPTION

Figure 5:
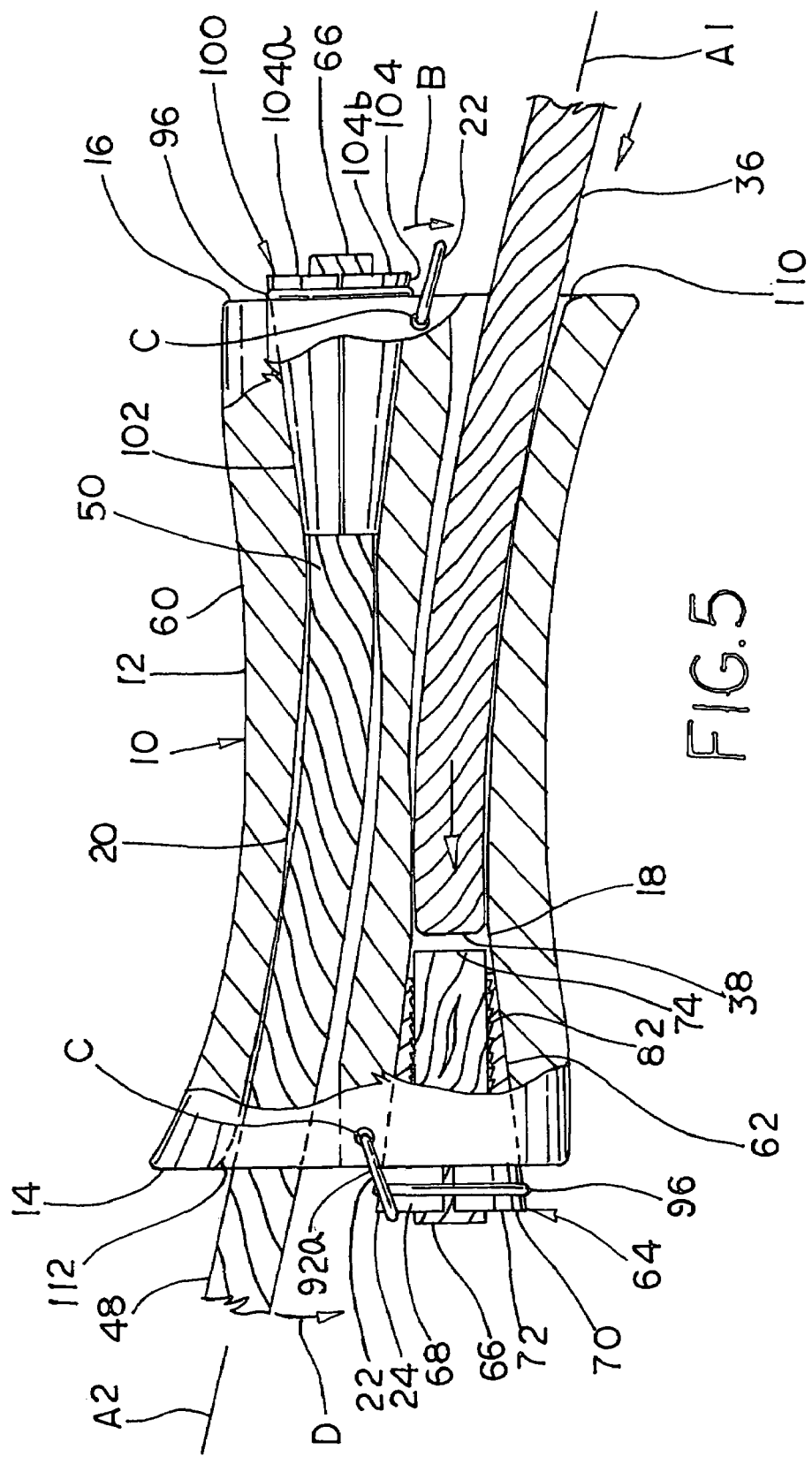
FIG. 5 is a partial section view taken along line 5-5 in FIG. 4 and illustrating one of the cables being inserted into the cable coupler and about to contact a plug.

Referring now to the drawings, and specifically to FIG. 5, a cable coupler 10 is depicted. The cable coupler 10 includes a body 12 that has a first end 14 and a second end 16 and has a first passageway 18 and a second passageway 20 that each extend from the first end 14 to the second end 16. A clip 22 is disposed on the body 12 adjacent the first end 14. A wedge assembly 24 is disposed in the first passageway 18 at the first end 14 and may be engaged by the retaining clip 22 as will be explained in greater detail below.

Referring back to FIG. 1, a cable truss system 30 incorporates the cable coupler 10 and is used to support a roof 32 of a mine passage 34. A typical mine passage 34 may incorporate one or more of such cable truss systems 30 spaced along the length of the mine passage 34 to help support the roof 32 of the mine passage 34. The cable truss system 30 includes a first cable 36 with a first end 38 and a second end 40. A first bore 42 extends into the roof 32 at an angle outward from the mine passage 34. The second end 40 of the first cable 36 is disposed in the first bore 42. In this example, a resin cartridge 44 is also disposed in the first bore 42 and secures the second end 40 of the first cable 36 in the first bore 42. Other known elements and methods can be used to secure the first cable 36 in the first bore 42. The first cable 36 extends through a first ring eye plate 46 and presses the eye plate 46 upward against the roof 32 of the mine passage 34.

The cable truss system 30 includes a second cable 48 with a first end 50 and a second end 52. A second bore 54 extends into the mine roof 32 at an angle outward from the mine passage 34. The second end 52 of the second cable 48 is disposed in the second bore 54. In this example, a second resin cartridge 56 is also disposed in the second bore 54 and secures the second end 52 of the second cable 48 in the second bore 54. Again, other known elements and methods can be used to secure the second cable 48 in the second bore 54. The second cable 48 extends through a second ring eye plate 58 and presses the eye plate 58 upward against the roof 32 of the mine passage 34.

The first end 38 of the first cable 36 and the first end 50 of the second cable 48 are both disposed in the cable coupler 10, as will be detailed herein. The cable coupler 10 maintains both the first cable 36 and the second cable 48 in a state of tension so as to create a compressive force on the roof 32 in the mine passage 34 to help support the roof 32.

Figure 2:
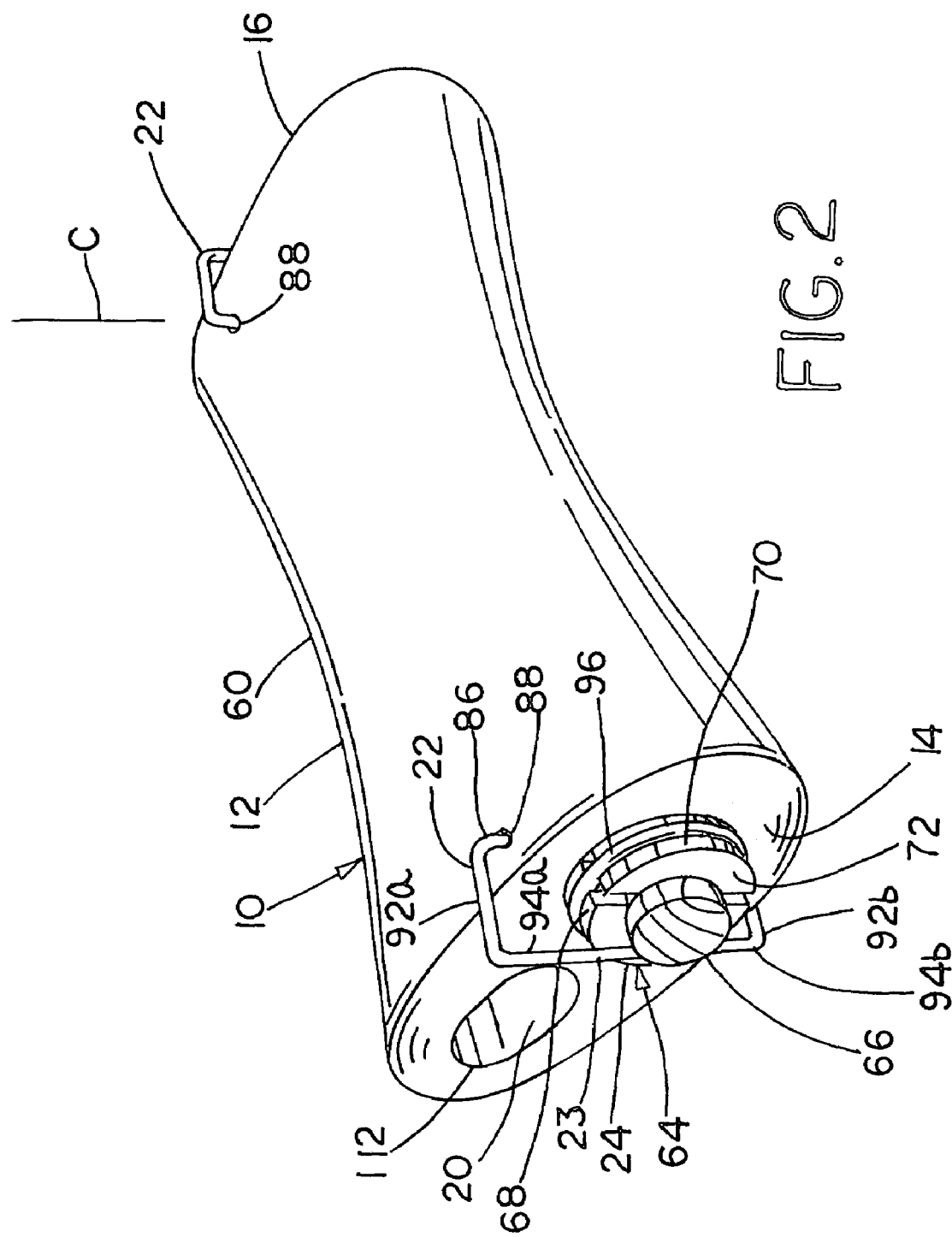
FIG. 2 is a perspective view of an exemplary cable coupler for the cable truss system of FIG. 1 shown prior to the insertion of the cables and constructed in accordance with the teachings of the present invention.
Figure 3:
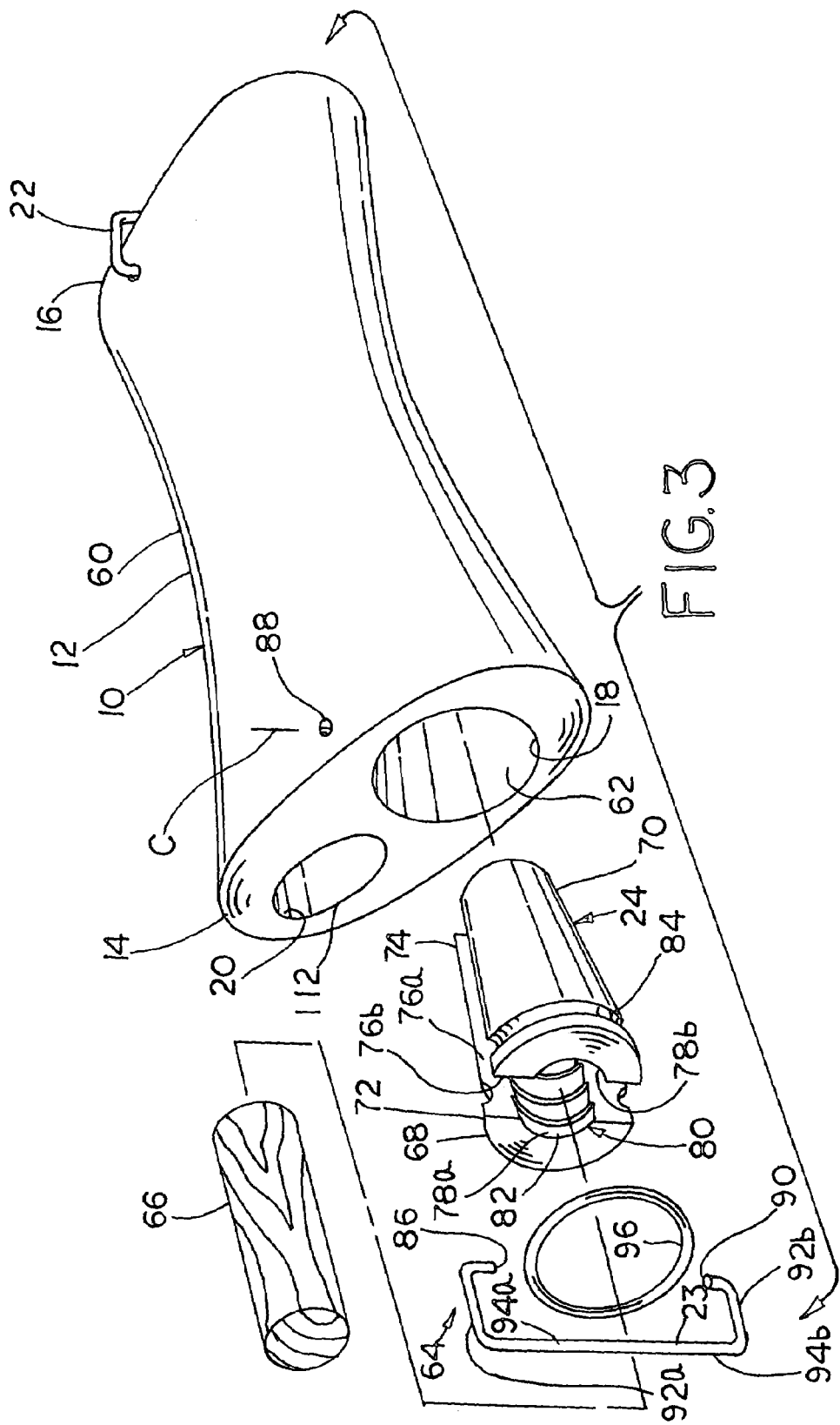
FIG. 3 is an exploded view of the cable coupler of FIG. 2.

Referring now to FIGS. 2 and 3, the cable coupler 10 is depicted in an assembled view (FIG. 2), and an exploded view (FIG. 3), prior to the insertion of either the first or second cables 36, 48. The cable coupler 10 includes the body 12 with the first end 14, the second end 16, and a sidewall 60 extending between the first end 14 and the second end 16. In this example, the sidewall 60 takes a generally curved hour glass or dog bone shape.

The first passageway 18 and the second passageway 20 extend from the first end 14 to the second end 16. Preferably, the passageways are disposed in a common plane. The first passageway 18 includes a tapered portion 62 which forms a seat for the wedges as would be common practice. The tapered portion 62 is generally conically shaped and is disposed adjacent the first passageway 18 near the first end 14.

The cable coupler 10 includes a cable lock 64 disposed adjacent the first end 14 of the first passageway 18. The cable lock 64 includes the wedge assembly 24, the clip 22, and a plug 66.

Figure 6:
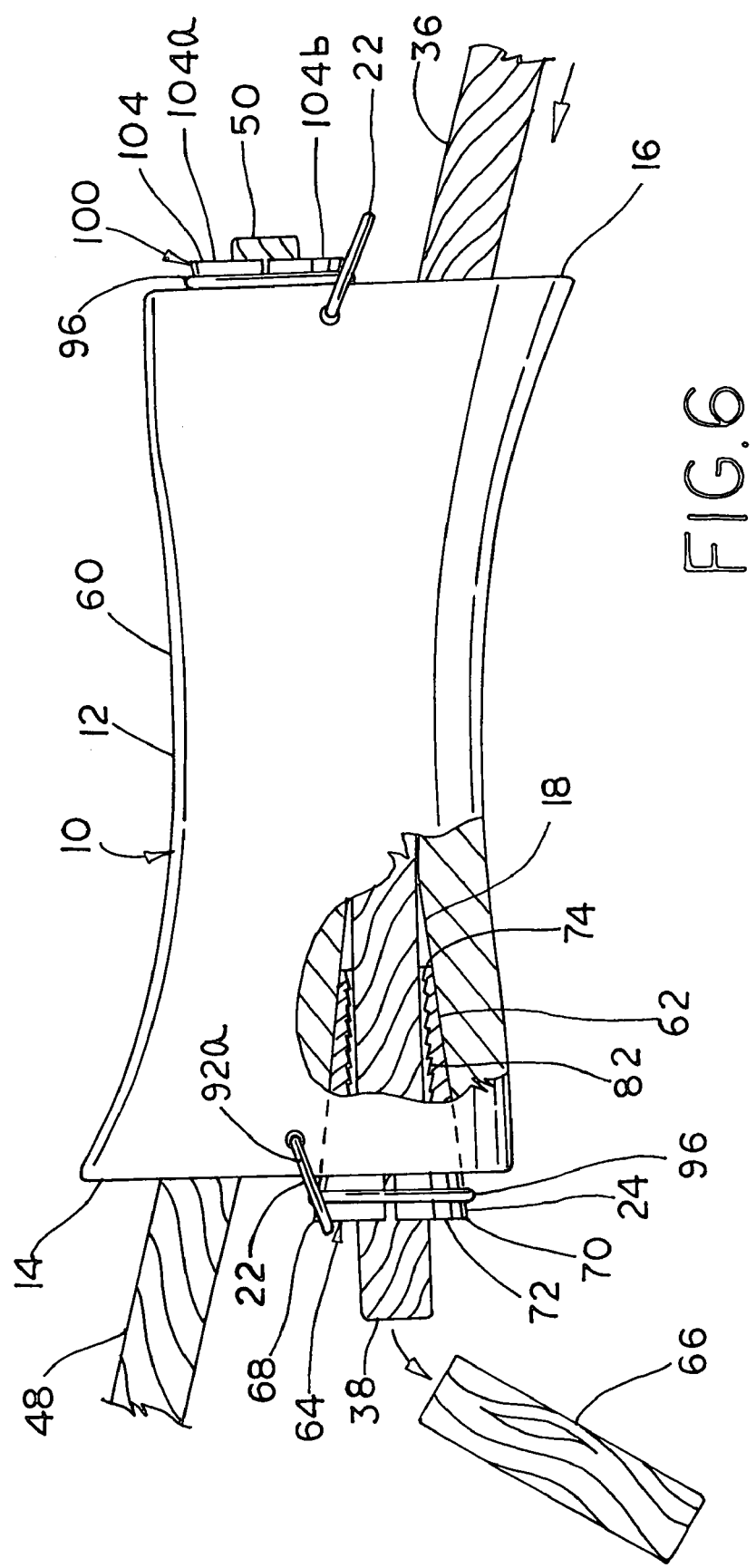
FIG. 6 is a top view of the cable coupler, partially in section, with the first cable being fully inserted through the cable coupler.
Figure 7:
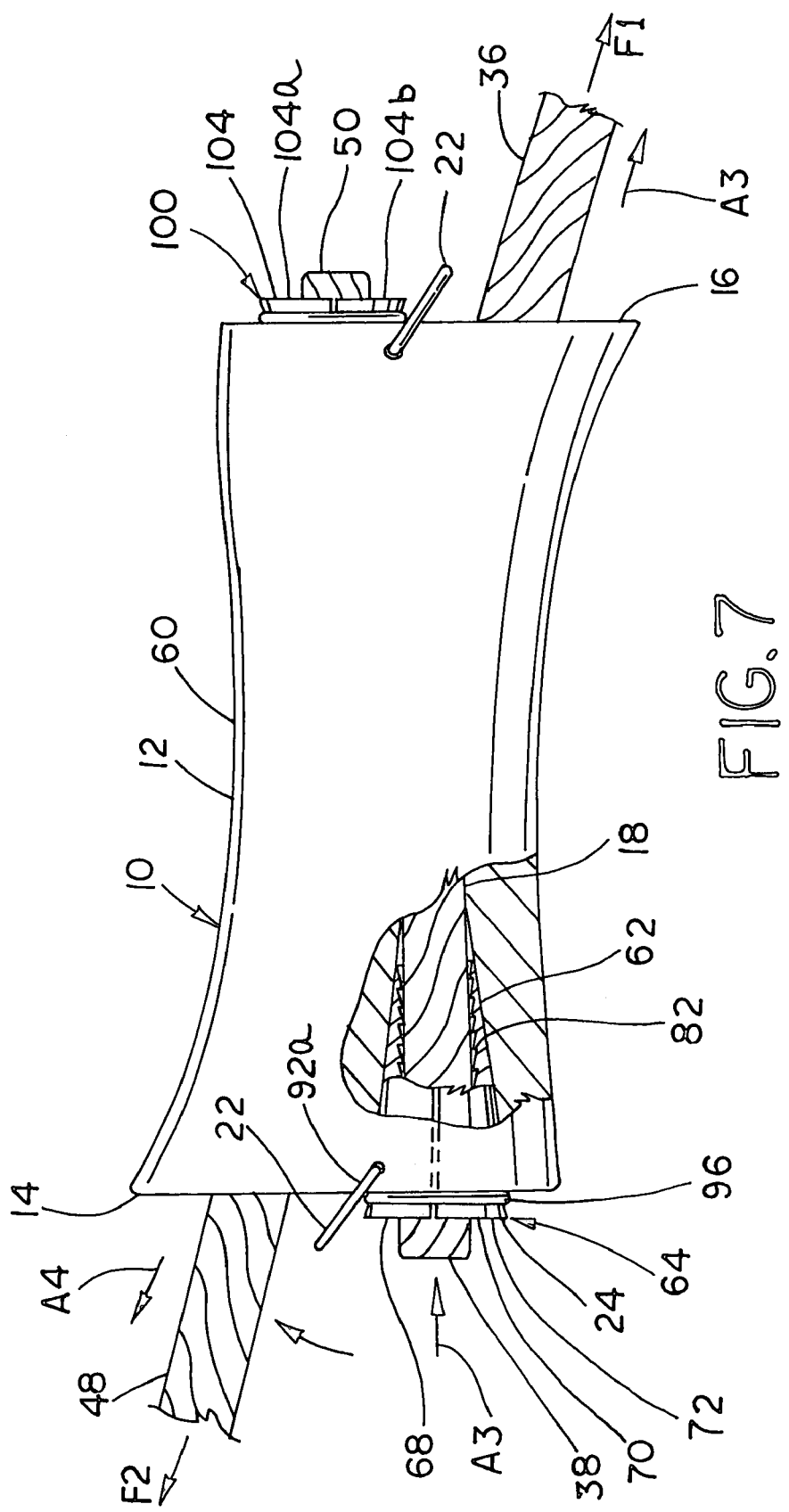
FIG. 7 is a top view of the cable coupler, partially in section, with the first cable being released after being tensioned in the cable coupler.

The retaining clip 22 may be positioned to engage the wedge assembly 24 as shown in FIG. 2, or it may be shifted away from the wedge assembly 24 as is shown at the right side of each of FIGS. 5 and 6, as well as on both sides of FIG. 7. The wedge assembly 24 includes at least a first wedge piece 68 and a second wedge piece 70 that combine to substantially form a truncated cone with a base 72 and a tip 74. Three-piece wedge assemblies or other suitable wedge assemblies may also be employed.

Each of the first wedge piece 68 and the second wedge piece 70 have an engaging face 76a, 76b such that when the wedge pieces 68, 70 are assembled to form the wedge assembly 24, the engaging faces 76a, 76b are in confronting relationship. Each of the first and second wedge pieces 68, 70 also include an internal cylindrical section 78a, 78b. When the wedge pieces 68, 70 are assembled to form the wedge assembly 24, the internal cylindrical sections 78a, 78b form a generally circular passage way 80 within the wedge assembly 24. A set of teeth 82 is disposed on the internal cylindrical sections 78a, 78b and is formed in a known way such that an object in the circular passage way 80 may be slid from the tip 74 of the wedge assembly 24 towards the base 72, but locked with respect to sliding from the base 72 toward the tip 74. A groove or recess 84 is disposed on the outside surface of each of the wedge pieces 68 70, generally adjacent to the base 72. The groove 84 encircles the wedge assembly 24 at a generally constant distant from the base 72.

The clip 22 includes a first end 86 disposed in a first recess 88 in the sidewall 60 near the first end 14 of the first passageway 18. The clip 22 further includes a second end 90 disposed in a second recess 90 (obstructed in the FIG.) and formed opposite the first recess 88. The clip 22 includes a pair of lateral portions 92a, 92b extending away from the first and second ends 86, 90, and a pair of side portions 94a, 94b extending towards each other from the lateral portions 92a, and 92b. As can be seen in FIG. 3, the clip 22 is generally C-shaped, and may be formed of spring steel or other material, and preferably may be flexible or resilient enough to be detached from the body 12 by withdrawing the ends 86, 90 from their corresponding recesses 88.

A ring 96 is sized to be seated in the groove 84 of the wedge assembly 24, and may serve to assist in retaining the wedge assembly 24 within the tapered portion 62, and may also generally maintain the wedge pieces 68, 70 together as the first cable 36 is pushed through the first passageway 18 and through the wedge assembly 24. The ring 96 is preferably a resilient O-ring formed from, for example, rubber or other suitable material. The ring 96 can also be made from plastic or a suitable metal, and is preferably flexible facilitate easy installation of the ring 96 into the groove 84 around the wedge assembly 24.

The plug 66 of the cable coupler 10 is disposed in the circular passage way 80 in the wedge assembly 24. The plug 66 maintains the wedge pieces 68, 70 slightly apart from each other, and the ring 96 maintains the wedge pieces 68, 70 against the plug 66. The plug 66 assists in holding the wedge assembly 24 in a position to receive the first cable 36 when the cable is inserted as shown in FIG. 5.

As can be best seen in FIG. 5, a second cable lock 100 is disposed adjacent a second tapered portion 102 in the second passageway 20 on the second end 16. The second cable lock 100 can include the same elements as the first cable lock 64, such as a second wedge assembly 104 with individual wedge pieces 104a, 104b, a second clip 22, a second ring 96, and a second plug 66. It will be appreciated that in FIG. 5, the retaining clip 22 shown to the right of the Figure is shown in an open position as will be explained in greater detail below.

Figure 4:
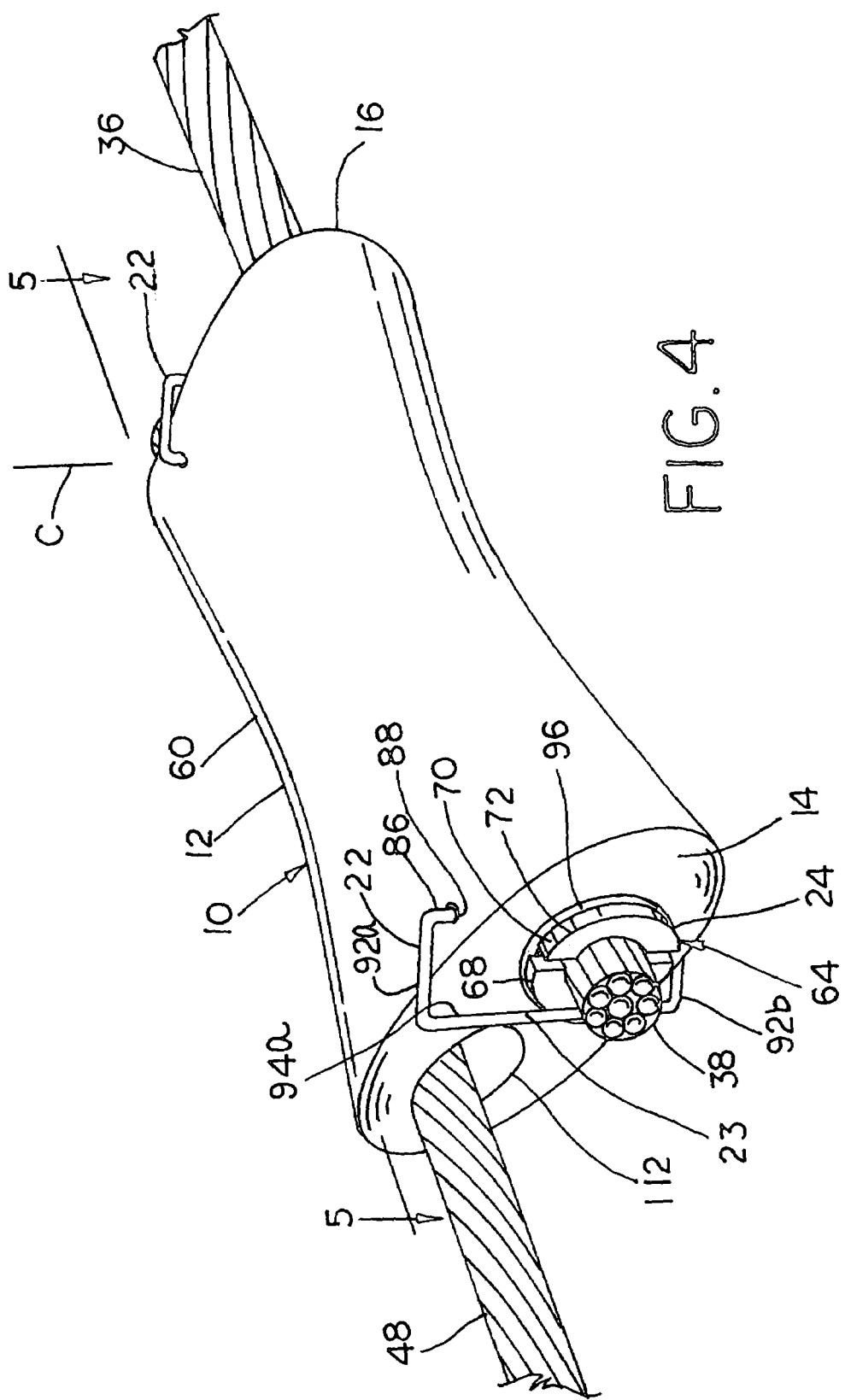
FIG. 4 is a perspective view of the cable coupler of FIG. 2 and further including a pair of anchored cables.

Referring back to FIG. 4, the cable coupler 10 is shown with first and second cables 36, 48 disposed in the first and second passageways 18, 20, respectively. The first end 38 of the first cable 36 extends through the first passageway 18 and the wedge assembly 24 and out the first end 14 of the first passageway 18. Likewise, the first end 50 of the second cable 48 extends into through the second passageway 20. As will be described herein, when each of the first and second cables 36, 48 are under tension, the wedge assemblies 24, by being pulled into the corresponding tapered portion of the passageways, will apply a gripping force to the cables and thus secure the first and second cables 36, 48 relative to the coupler 10 and each other.

Referring now to FIG. 5, the configuration of the first and second passageway 18, 20 is shown. The first and second passageway 18, 20 are each curved to generally follow the hour glass shape of the body 12 and extend generally in the same plane. The second end 16 of the first passageway 18 defines a first axis A1 and the first end 14 of the second passageway 20 defines a second axis A2 that is generally aligned with the first axis A1. The second end 16 of the first passageway 18 includes a relief 110 in which the cross section of the first passageway 18 is enlarged. This eases the insertion of the first cable 36 into the first passageway 18. It further removes sharp corners that may abrade or damage the first cable 36 when it is under tension. The second passageway 20 includes a similar relief 112 at the first end 14.

The process of inserting the cables 36, 48 into the cable coupler 10 and locking the cables 36, 48 in the cable coupler 10 will now be described. Referring again to FIG. 5, the first cable 36 is shown as it is being inserted into the first passageway 18, and the second cable 48 is shown already inserted through the second passageway 20 almost to the plug 66. As will be understood, due to the symmetry of the anchor 10, the process of the insertion and locking of the second cable 48 is the same process as for the first cable 36.

The first cable 36 is shown inserted partially into the first passageway 18. In general, this step is performed by hand as a user simply holds the anchor 10 in one hand and the first end 38 of the first cable 36 in the other hand and inserts the first cable 36 into the first passageway 18. It will be appreciated that in accordance with the disclosed example the clip 22 and the ring 96 cooperate to maintain both wedge pieces of the wedge assembly 24 in the tapered portion of the passageway, thus preventing or minimizing the chances that one or more wedge pieces will be dropped and/or lost.

As shown in FIG. 5, the first cable 36 has been inserted to the point where it is in confronting relationship with the plug 66. As the user pushes the first cable 36 further, the first end 38 of the first cable 36 contacts the plug 66. The plug 66 maintains the wedge assembly 24 outwardly such that the wedge assembly 24 is in a first position to receive the first cable 36. The plug 66 can have a diameter slightly larger than the diameter of the first cable 36 to ensure that the wedge assembly 24 is held outwardly far enough to ease the entrance of the first cable 36 into the circular passage 80 of the wedge assembly 24. The tip of the first cable 36 may be sized to ensure that it slides easily into the wedge assembly 24.

Referring now to FIG. 6, the first cable 36 is pushed further through the first passageway 18 and pushes the plug 66 through the wedge assembly 24 until the first end 38 of the first cable 36 has been pushed through the wedge assembly 24 and extends out past the first end 14 of the first passageway 18. The teeth 82 of the wedge assembly 24 are oriented to allow the plug 66 and the first cable 36 to slide from the second end 16 to the first end 14 of the first passageway 18, but to grip and hold the first cable 36 fast as it is placed under tension and tends to slide toward the second end 16 of the first passageway 18. Again, the second cable 48 can be inserted in the same way either before or after the insertion of the first cable 36.

The user can tighten the first and second cables 36, 48 by hand by pulling each of them until they are taut or by suitable machine tensioning. Referring again to the first cable 36, the clip 22 maintains the wedge assembly 24 in position generally in the tapered portion 62 as the first cable 36 is inserted through the wedge assembly 24 and the plug 66 is pushed out. After the first cable 36 has been pulled through the body and the cable has been tensioned, the wedge assembly 24 has been pulled into the tapered portion 62. The ring 96 is preferably resilient enough so as not to interfere with the motion of the wedge pieces into the tapered portion 62 such that the ring 96 does not interfere with the stressing of the first cable 24.

At this point a tensioner is generally employed to pull the first cable 36 through the anchor 10. When a predetermined tension has been reached and the first cable 36 has been stretched a predetermined distance, the tensioner releases the first cable 36. Referring now to FIG. 7, after the first cable 36 is released, the tension is distributed over both the first cable 36 and the second cable 48, and the cables 36, 48 pull back through the body 12 in directions A3, A4. The teeth 82 of the wedge assemblies 24, 104 engage the first and second cables 36, 48 as the cables 36, 48 pull back. The wedge assemblies 24, 104 are pulled back into the body 12 until they engage their respective tapered portions 62, 102. As the wedge assemblies 24, 104 are pulled back into their tapered portion 62, 102, the wedges assemblies 24, 104 are forced by the tapered portions 62, 102 to close progressively tighter around the first and second cables 36, 48 to a second position where the cables 36, 48 are locked in place.

The tension in the first cable 36 creates a force F1 along the first axis A1 and the tension in the second cable 48 creates a force F2 along the second axis A2. Because the first axis A1 and the second axis A2 are generally aligned, the force F1 and the force F2 are opposite one another. This may serve to minimize any torque that would be created if the forces F1 and F2 were skew. Accordingly, the cable coupler 10 does not twist or twists only at a minimum, and the cables 36, 48 are not forced against the edges of the passageways 18, 20.

In accordance with the disclosed example, the clip 22 holding the wedge pieces 68, 70 in the wedge seat allows the user to simply insert the first cable 36 through the first passageway 18 with perhaps less manipulation of the wedge pieces 68, 70. The user may not have to manually insert the wedge pieces 68, 70 into the tapered portion 62 after the cable 36 is placed in the first passageway 18, as in the prior art. The disclosed example further alleviates the problem associated with dark working conditions of a mine passage in which the small wedges may become lost. The manufacturer may find the disclosed example lessens or eliminates the need to include extra wedge pieces. As can be understood, the present design may be faster and easier to use relative to the prior art.

Referring now to FIG. 5, the wedge assembly 24 can be installed in the tapered portion 62 as follows. The plug 66 is positioned between the individual wedge pieces 68, 70 of the wedge assembly 24, and the ring 96 is positioned into the groove 84 formed adjacent the ends of the wedge pieces 68, 70. As is shown in the right hand side of FIG. 5, the retaining clip 22 (as well as the retaining clip 22 at the left of the FIG.) may be pivoted to an open position by pivoting the retaining clip 22 in the direction B about an axis C (extending into the plane of the FIG.) formed by the recesses 88. In the open position, such as is shown to the right of FIG. 5, a central portion 23 of the clip 22 is moved away from the opening of the tapered portion, such that the tapered portion is unobstructed by the clip 22. In the open position, a wedge assembly 24, plug, and ring, assembled as discussed above, may be freely inserted into the corresponding tapered portion of the corresponding passaway. The wedge pieces 68, 70 and the plug 66, held together by the ring 96, may then be inserted as a single unit into the tapered portion 62 of the passageway.

Once the wedge assembly, the plug, and the ring are inserted into the tapered portion as discussed above, the clip 22 may be shifted to a closed position, such as is shown to the left of FIG. 5. The clip 22 may pivot in the direction D about the axis C (the axis C extends into the plane of the FIG.). In the closed position, the central portion 23 of the clip 22 is positioned to obstruct a portion of the passageway, such that the wedge assembly 24 in the tapered portion is retained in the passage by the clip 22.

The foregoing description is not intended to limit the scope of the invention to the form disclosed. It is contemplated that various changes and modifications may be those skilled in the art without departing from the spirit and scope of the invention.

We claim:

1. A cable coupler comprising:

a body having a first end, a second end, and first and second passageways extending between the first end and the second end, each passageway sized and shaped to receive a cable, each passageway including a tapered portion;

the tapered portion of the first passageway disposed adjacent the first end of the body and the tapered portion of the second passageway disposed adjacent the second end of the body;

a first wedge assembly disposed in the tapered portion of the first passageway and a second wedge assembly disposed in the tapered portion of the second passageway, each of the first and second wedge assemblies comprising at least two wedge pieces and arranged to secure a cable to the body; and a first retaining clip disposed adjacent the first end of the body adjacent the tapered portion and a second retaining clip disposed adjacent the second end of the body adjacent the tapered portion;

each retaining clip shiftable between a closed position in which the retaining clip obstructs a portion of the corresponding passageway thereby preventing the corresponding wedge assembly from exiting the corresponding passageway, and an open position in which the corresponding passageway is unobstructed.

2. The cable coupler of claim 1, wherein each wedge piece includes a recess, and a retaining ring is sized to fit in the recess and arranged to hold the wedge pieces together.

3. The cable coupler of claim 1, wherein the first passageway and the second passageway extend in a common plane.

4. The cable coupler of claim 1, further comprising an O-ring disposed around at least one of the wedge assemblies.

5. The cable coupler of claim 4, wherein the O-ring is seated in a groove defined in a portion of the at least one wedge assembly.

6. The cable coupler of claim 4, wherein the O-ring is resilient and is sized to fit within a portion of the passageway.

7. The cable coupler of claim 1, wherein each of the retaining clips includes a pair of ends, each of the pair of ends disposed in a corresponding recess in the body.

8. The cable coupler of claim 1, wherein the retaining clip is flexible.

9. The cable coupler of claim 1, wherein the retaining clip is formed of spring steel.

10. The cable coupler of claim 1, further comprising a plug disposed in each of the wedge assemblies, the plug arranged to maintain each of the wedge assemblies generally adjacent the corresponding retaining clip when the corresponding retaining clip is in the closed position.

11. The cable coupler of claim 10, wherein the plug is cylindrical.

12. The cable coupler of claim 1, wherein the wedge pieces include a recess, and an O-ring is sized to fit within the recess.

13. The cable coupler of claim 12, including a cylindrical plug sized for insertion between the wedge pieces.

14. The cable coupler of claim 12, wherein the retaining clip is C-shaped and includes a pair of ends, each end sized to engage a mounting recess in the body.

15. A cable coupler comprising:

a body having a first end, a second end, and first and second passageways extending between the first end and the second end, each passageway sized and shaped to receive a cable, each passageway including a tapered portion, the tapered portion of the first passageway and the tapered portion of the second passageway disposed at opposite ends of the body;

a wedge assembly disposed in the tapered portion of each passageway and arranged to secure a cable to the body from opposite directions;

a pair of recesses formed on opposite sides of the body adjacent each of the ends; and a clip assembly provided adjacent each of the ends of the body, each clip assembly operatively coupled to a pair of the recesses, each clip assembly shiftable between a closed position in which the clip assembly obstructs a portion of the corresponding passageway, thereby preventing an adjacent one of the wedge assemblies from exiting the corresponding passageway, and an open position in which the adjacent wedge assembly is insertable into the tapered portion of the corresponding passageway.

16. The cable coupler of claim 15, wherein each wedge assembly includes a cylindrical plug.

17. The cable coupler of claim 15, wherein each wedge assembly includes a pair of wedge halves, each wedge halve including a recess, and further including an O-ring sized to fit in the recess and arranged to hold the wedge halves together.

18. The cable coupler of claim 17, wherein the ring is formed of a resilient material.

19. The cable coupler of claim 15, wherein the first passageway and the second passageway extend in a common plane.

20. The cable coupler of claim 15, wherein each clip assembly includes a pair of ends, each of the pair of ends disposed in a corresponding recess in the body.

21. The cable coupler of claim 20, wherein each clip assembly comprises a C-shaped clip having a central portion sized to partially obstruct the corresponding tapered portion when the clip assembly is in the closed position.

22. The cable coupler of claim 15, wherein each clip assembly is flexible.

* * * * *

UNITED STATES PATENT AND TRADEMARK OFFICE
Certificate

Patent No. 7,384,216 B2　　　　　　　　　　　　　　　　　　　　　　　Patented: June 10, 2008

On petition requesting issuance of a certificate for correction of inventorship pursuant to 35 U.S.C. 256, it has been found that the above identified patent, through error and without any deceptive intent, improperly sets forth the inventorship.
　　Accordingly, it is hereby certified that the correct inventorship of this patent is: Alexander I. Wallstein, Laguna Beach, CA (US).

Signed and Sealed this Tenth day of August 2010.

THOMAS B. WILL
*Supervisory Patent Examiner*
Art Unit 3671
Technology Center 3600